Patented July 10, 1934

1,966,103

UNITED STATES PATENT OFFICE

1,966,103

PROCESS FOR THE PURIFICATION OF AND PARTICULARLY FOR THE ELIMINATION OF ACIDS FROM HYDROGEN PEROXIDE SOLUTIONS BY ELECTROLYSIS

Josef Müller, Weissenstein - above - the - Drau, Karnten, Austria, assignor to Oesterreichische Chemische Werke Gesellschaft m. b. H., Vienna, Austria, a corporation of Austria No Drawing. Application May 21, 1931. Serial No. 539,148. In Austria July 24, 1930

17 Claims. (Cl. 204—9)

The purification of hydrogen peroxide solutions manufactured at a commercial scale and particularly the elimination of acids from these solutions which always contain from the manufacture some smaller or greater amounts of acids and generally also metallic impurities involves considerable difficulties in practice. For purifying the hydrogen peroxide solutions manufactured at a large scale chiefly distillation in vacuo has been employed. This method has, however, many disadvantages. It requires expensive plants, is also costly in operation and furthermore never yields products of a very high degree of purity, if the starting solutions contain volatile impurities such as for instance volatile acids.

The present process for purifying hydrogen peroxide solutions essentially consists in subjecting the solution to be purified to electrolysis within a diaphragm cell, either as anodic or as cathodic liquid. If impurities are to be removed, which migrate to the cathode, as for instance metallic ions, the solutions to be purified are treated at the anode. If anions are to be removed, as for instance in the case of elimination of the acids the solution is subjected to electrolysis as cathodic liquid. By successively effecting an anodic and cathodic treatment impurities of electro-negative as well as such of electro-positive nature can be removed from the solutions. Moreover the process permits introducing into the solution during the electrolysis by ionic migration substances, which are desirable to be present in the electrolytically purified solution.

Most surprisingly no substantial decrease of the oxygen concentration takes place neither by the contact of the hydrogen peroxide solutions with the anode nor by that with the cathode, not even in the case of the solutions being concentrated. For explaining this remarkable behaviour it may be supposed that cushions of gas are formed on the electrodes which act as protective intermediate layers so that no substantial loss will be caused by cathodic decomposition even when using platinum electrodes.

If the hydrogen peroxide solution to be purified constitutes the cathode liquid, acidulated distilled water may for instance be used as anode liquid. Preferably, however, also a hydrogen peroxide solution of approximately the same concentration is employed as anodic liquid in order to prevent loss of concentration by diffusion. If the hydrogen peroxide solution has to be purified anodically, the cathode liquid may likewise be distilled water which in this case for instance by the addition of alkaline electrolytes is rendered conductive, or a hydrogen peroxide solution of equal concentration. If it is intended to subject a $H_2O_2$ solution freed from acid by a cathode treatment hereafter also to a purification by an anodic treatment, it is to be recommended to use pure diluted phosphoric acid or the solution of a phosphate or of a pyrophosphate as cathode liquid. The electrolyte rendering the solution conductive serves in this case at the same time for incorporating a stabilizer with the purified solution by ionic migration.

The voltage of the cell and the intensity of the current are to a great deal dependent upon the kind of apparatus used and also upon the quality of the starting solutions and must, for obtaining the result aimed at, be found out by preliminary experiments.

The process consumes very little current and the losses of active oxygen caused are less than those occurring in the purification by distillation. By cathodic treatment of the $H_2O_2$ solutions results such a perfect elimination of acids as is not attainable in any other manner, also not by electro-osmotic purification effected in the manner of purification of water, in which the solution to be purified is treated within an intermediate cell separated by diaphragms from the cathode space as well as from the anode space. The solutions are moreover in the new process simultaneously also freed from metallic impurities such as iron, which are deposited at the cathode. Likewise also by anodic purification all cations, particularly iron, which may be present, can be removed from the solution to a far going extent.

The process may be carried out within one single cell or a plurality of cells connected in series may be used. In the latter case the hydrogen peroxide solution is continuously supplied and flows for the purpose of anodic purification from anode space to anode space of the cells in series connection whilst the catholyte is supplemented preferably only by diffusion and electrolytic transport. The purified solution is discharged from the anode space of the last cell. In the catholyte of this last cell the impurities electrolytically removed are accumulated. If the purification is effected cathodically, the entire operation takes place in a reversed sense.

The velocity of flow is preferably so adjusted that the solution under treatment will leave the last cell in a perfectly purified state. The voltage increases gradually from cell to cell and rises suddenly in the last cell, where the complete purification of the solution is accomplished. If the voltage in this last cell should not rise so far that the risk of a back diffusion of impurities into the purified solution is prevented, a suitable increase of the voltage must be effected by alteration of the electrical conditions, for instance by disconnecting one of the preceding cells from the series.

If in the case of a cathodic purification of solutions contaminated by acids there are not sufficient cations present of such a kind, that after electrolytic discharge they will dissolve again, or if in the case of anodic purification of solutions contaminated by metals not sufficient anions be present, the conductivity of the electrolyte would decrease with the progressing purity of the solution below the necessary degree.

According to the invention in the one case suitable cations, in the other additional anions are introduced into the electrolyte in very small quantities and in the form of compounds, the counter ion of which does not contaminate the solution. If for instance an acid solution of hydrogen peroxide, which does not contain alkali ions or alkaline earth ions, ought to be perfectly freed from the acids, care has to be taken that the catholyte remains sufficiently conductive up to the accomplishment of the electrolysis, this being effected by the addition of quite small amounts of alkali ions or alkaline earth ions, for instance in the form of hydroxides.

Examples

1. Cathodic purification of, especially elimination of acids from a hydrogen peroxide solution containing about 30% of $H_2O_2$ and 0.1% total acid contents (sulphuric acid and hydrochloric acid): For the electrolysis, a diaphragm cell having a cathode space of say 400 cubic centimeters and an anode space of say 100 cubic centimeters contents is used. The cathode space is charged with the solution to be purified, to which traces of NaOH are added. Into the anode space is introduced a solution of about 1% to 2% of chemically pure sulphuric acid in distilled water or the same quantity of a hydrogen peroxide solution having the same concentration as the solution to be purified. As cathode serves a graphite rod, as anode a sheet of platinum. Also tin, aluminium, nickel or special steels may be used as cathode. A current of about 0.25 amperes is supplied to the cell and the supply maintained until the catholyte has become free from acid. The voltage of the cell can under the above mentioned conditions amount to say 15 volts at the beginning of the electrolysis and may increase to say 45 volts until complete purification is achieved. A hydrogen peroxide solution which prior to the purification had a residue from flowing of about 0.25%, showed after treatment such a residue of 0.01%, whilst in the solution neither hydrochloric acid nor sulphuric acid could be found by analysis.

2. Anodic purification of a hydrogen peroxide solution with 15% of $H_2O_2$ in which catalytically acting metal ions are contained as contaminating substances. The same apparatus is used as in Example 1 with the only difference, that sheets of platinum are used for the anode as well as for the cathode. The current lead supplied is the same too. The $H_2O_2$ solution to be purified is introduced in this case into the anode space which is in this arrangement the larger electrode space. Into the cathode space, distilled water containing a little phosphoric acid is introduced. The metallic ions will migrate to the cathode and will thus be removed from the anolyte. Simultaneously by ionic migration also a little phosphoric acid incorporates with the anolyte, the presence of which promotes the stability of the solution. In this manner even from starting solutions which are strongly contaminated with metals, the metal ions can be removed so far that the solutions show thereafter an excellent stability.

3. By successively effecting treatments according to Examples 1 and 2 exceedingly pure solutions are obtained, which are particularly adapted for therapeutical purposes and are stable for an unlimited time.

I claim:

1. Process for the purification of hydrogen peroxide solutions, which comprises subjecting the solution to be purified to electrolysis within a diaphragm cell in direct contact with one electrode of this cell, the said solution constituting one of two electrolytes separated from each other in two opposite compartments, the electrolyte in the compartment opposite the one in which the solution to be purified is treated being a solution of the class consisting of water and aqueous hydrogen peroxide, and capable of conducting the electric current.

2. Process for the purification of hydrogen peroxide solutions, which comprises subjecting the solution to be purified to electrolysis successively as catholyte and anolyte in any order of succession, the said solution constituting one of two electrolytes separated from each other in two opposite compartments, the electrolyte in the compartment opposite the one in which the solution to be purified is treated being a solution of the class consisting of water and aqueous hydrogen peroxide, and capable of conducting the electric current.

3. Process for the purification of hydrogen peroxide solutions, which comprises subjecting the solution to be purified as catholyte to electrolysis within a diaphragm cell in direct contact with the cathode of this cell, the anolyte being a solution of the class consisting of water and aqueous hydrogen peroxide containing an addition of an acid so as to render the anolyte electrically conductive, the catholyte and the anolyte being separated from each other.

4. Process for the purification of hydrogen peroxide solutions, which comprises subjecting the solution to be purified as anolyte to electrolysis within a diaphragm cell in direct contact with the anode of this cell, the catholyte being a solution of the class consisting of water and aqueous hydrogen peroxide containing an addition of an alkaline electrolyte so as to render the catholyte electrically conductive, the anolyte and the catholyte being separated from each other.

5. Process for the purification of hydrogen peroxide solutions, which comprises subjecting the solution to be purified to electrolysis within a diaphragm cell in direct contact with one electrode of this cell, the said solution constituting one of two electrolytes separated from each other in two opposite compartments, the electrolyte in the compartment opposite the one in which the solution to be purified is treated being a solution of the class consisting of water and aqueous hydrogen peroxide, and capable of conducting the electric current, incorporating with the solution to be purified from the electrolyte in the said opposite compartment by ionic migration in the course of the electrolysis substances the presence of which being desirable in the electrolytically purified solution.

6. Process for the anodic purification of hydrogen peroxide solutions which comprises subjecting the solution to be purified to electrolysis within a diaphragm cell in contact with one electrode of this cell, the said solution constituting the anode liquid and a diluted solution of one of the class consisting of phosphoric acid, a phosphate or a pyrophosphate constituting the cathode liquid, the two electrolytes being separated from each other.

7. Process for the purification of hydrogen peroxide solutions, which comprises subjecting the solution to be purified to electrolysis within a diaphragm cell in direct contact with one electrode of this cell, the said solution constituting one of two electrolytes separated from each other in two opposite compartments, the electrolyte in the compartment opposite the one in which the solution to be purified is treated being a solution of the class consisting of water and aqueous hydrogen peroxide, and capable of conducting the electric current, the solution to be purified containing an addition of small amounts of compounds yielding ions which act as carrier for the electric current and do not contaminate said solution.

8. Process for the purification of hydrogen peroxide solutions, which comprises subjecting the solution to be purified as catholyte to electrolysis within a diaphragm cell in direct contact with the cathode of this cell, the anolyte being a solution of the class consisting of water and aqueous hydrogen peroxide, and capable of conducting the electric current, while adding to the solution to be purified hydroxides of the class consisting of hydroxides of alkali metals and earth alkali metals.

9. Process for the purification of hydrogen peroxide solutions, which comprises subjecting the solution to be purified to electrolysis within a diaphragm cell in direct contact with one electrode of this cell, the said solution constituting one of two electrolytes separated from each other in two opposite compartments, the electrolyte in the compartment opposite the one in which the solution to be purified is treated being a hydrogen peroxide solution, and capable of conducting the electric current and having substantially the same concentration as the solution to be purified.

10. Process for the purification of hydrogen peroxide solutions, which comprises subjecting the solution to be purified to electrolysis within a diaphragm cell in direct contact with one electrode of this cell, the said solution constituting one of two electrolytes separated from each other in two opposite compartments, the electrolyte in the compartment opposite the one in which the solution to be purified is treated being a solution of the class consisting of water and aqueous hydrogen peroxide, and capable of conducting the electric current, the impurities being transferred by the electric current from one electrode compartment to the opposite electrode compartment.

11. Process for the purification of hydrogen peroxide solutions, which comprises subjecting the solution to be purified to electrolysis within a diaphragm cell in direct contact with electrode of this cell, the said solution constituting one of two electrolytes separated from each other in two opposite compartments, the electrolyte in the compartment opposite the one in which the solution to be purified is treated being a solution of the class consisting of water and aqeuous hydrogen peroxide, and capable of conducting the electric current, the solution to be purified being continuously supplied through a plurality of cells connected in series.

12. Process for the purification of hydrogen peroxide solutions, which comprises subjecting the solution to be purified to electrolysis within a diaphragm cell in direct contact with one electrode of this cell, the said solution constituting one of two electrolytes separated from each other in two opposite compartments, the electrolyte in the compartment opposite the one in which the solution to be purified is treated being a solution of the class consisting of water and aqueous hydrogen peroxide, and capable of conducting the electric current, the solution to be purified being continuously supplied through a plurality of cells connected in series, and maintaining in the last cell a voltage which is sufficient to prevent back diffusion of impurities into the purified solution.

13. Process for the purification of hydrogen peroxide solutions, which comprises subjecting the solution to be purified to electrolysis within a diaphragm cell in direct contact with one electrode of this cell, the said solution constituting one of two electrolytes separated from each other in two opposite compartments, the electrolyte in the compartment opposite the one in which the solution to be purified is treated being a solution of the class consisting of water and aqueous hydrogen peroxide, and capable of conducting the electric current, the solution to be purified containing an addition of small amounts of compounds yielding ions which act as carrier for the electric current and do not contaminate said solution being continuously supplied through a plurality of cells connected in series.

14. Process for the purification of hydrogen peroxide solutions, which comprises subjecting the solution to be purified to electrolysis within a diaphragm cell in direct contact with one electrode of this cell, the said solution constituting one of two electrolytes separated from each other in two opposite compartments, the electrolyte in the compartment opposite the one in which the solution to be purified is treated being a solution of the class consisting of water and aqueous hydrogen peroxide and capable of conducting the electric current, the solution to be purified containing an addition of small amounts of compounds yielding ions which act as carrier for the electric current and are retained in the purified solution as a stabilizer, the solution to be purified being continuously supplied through a plurality of cells connected in series.

15. Process for the purification of hydrogen peroxide solutions which comprises subjecting the solution to be purified to electrolysis within a diaphragm cell in direct contact with one electrode of this cell, the said solution constituting one of two electrolytes separated from each other in two opposite compartments, the electrolyte in the compartment opposite the one in which the solution to be purified is treated being a solution of the class consisting of water and aqueous hydrogen peroxide, and capable of conducting the electric current, the solution to be purified being continuously supplied to one electrode compartment, and the other electrolyte being completed by diffusion and electrolytic transport.

16. Process for the purification of hydrogen peroxide solutions, which comprises subjecting the solution to be purified to electrolysis within a diaphragm cell in direct contact with one electrode of this cell, the said solution constituting one of two electrolytes separated from each other in two opposite compartments, the electrolyte in the compartment opposite the one in which the solution to be purified is treated being a solution of the class consisting of water and aqueous hydrogen peroxide, and capable of conducting the electric current, the solution to be purified being continuously supplied through a plurality of cells connected in series, flowing from anode compartment to anode compartment, and the other electrolyte being completed by diffusion and electrolytic transport.

17. Process for the purification of hydrogen peroxide solutions, which comprises subjecting the solution to be purified to electrolysis within a diaphragm cell in direct contact with one electrode of this cell, the said solution constituting one of two electrolytes separated from each other in two opposite compartments, the electrolyte in the compartment opposite the one in which the solution to be purified is treated being a solution of the class consisting of water and aqueous hydrogen peroxide, and capable of conducting the electric current, the solution to be purified being continuously supplied through a plurality of cells connected in series, flowing from cathode compartment to cathode compartment, and the other electrolyte being completed by diffusion and electrolytic transport.

JOSEF MÜLLER.